(12) United States Patent
Chun (10) Patent No.: US 12,464,190 B2
(45) Date of Patent: Nov. 4, 2025

(54) DRIVE VIDEO RECORDING SYSTEM AND CONTROLLING METHOD OF THE SAME

(71) Applicants: Hyundai Motor Company, Seoul (KR); Kia Corporation, Seoul (KR)

(72) Inventor: Sang Woo Chun, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 56 days.

(21) Appl. No.: 18/521,786

(22) Filed: Nov. 28, 2023

(65) Prior Publication Data

US 2025/0030915 A1 Jan. 23, 2025

(30) Foreign Application Priority Data

Jul. 19, 2023 (KR) ........................ 10-2023-0093824

(51) Int. Cl.
*H04N 21/442* (2011.01)
*H04N 21/414* (2011.01)
*H04N 21/433* (2011.01)

(52) U.S. Cl.
CPC ..... *H04N 21/442* (2013.01); *H04N 21/41422* (2013.01); *H04N 21/4334* (2013.01)

(58) Field of Classification Search
CPC ........... H04N 21/442; H04N 21/41422; H04N 21/4334; H04N 7/188; H04N 7/183; G06V 20/40; G06V 20/44; B60R 11/04
See application file for complete search history.

(56) References Cited

U.S. PATENT DOCUMENTS

| | | | |
|---|---|---|---|
| 10,979,679 B1* | 4/2021 | Williams | H04N 7/188 |
| 2007/0150138 A1* | 6/2007 | Plante | H04N 21/44 701/33.4 |
| 2007/0219686 A1* | 9/2007 | Plante | H04N 7/188 701/33.4 |
| 2008/0281485 A1* | 11/2008 | Plante | H04N 21/4223 701/33.4 |
| 2009/0058995 A1* | 3/2009 | Yamashita | G07C 5/085 348/E9.002 |
| 2010/0229207 A1* | 9/2010 | Eckhardt | H04N 21/41422 725/75 |
| 2011/0254676 A1* | 10/2011 | Marumoto | G07C 5/008 340/441 |
| 2012/0268601 A1* | 10/2012 | Yeh | H04N 7/188 348/148 |
| 2015/0181172 A1* | 6/2015 | Plante | H04N 7/181 348/148 |
| 2016/0381292 A1* | 12/2016 | Lu | B60R 11/0235 348/36 |

(Continued)

*Primary Examiner* — Fernando Alcon
(74) *Attorney, Agent, or Firm* — Fox Rothschild LLP (57) ABSTRACT

A drive video recording system includes an impact detection sensor; a camera module which monitors the surroundings of a vehicle; a first memory which stores a video transmitted from the camera module; a second memory which stores a computer program for controlling the storage of the video; and a controller which includes a processor executing the computer program, where the processor determines a serious damage situation according to an impact signal of the impact detection sensor through the execution of the computer program, and determines a recording mode as a serious damage recording mode according to the determination result of the serious damage situation.

19 Claims, 5 Drawing Sheets

(56) References Cited

U.S. PATENT DOCUMENTS

| | | | | |
|---|---|---|---|---|
| 2018/0007323 | A1* | 1/2018 | Botusescu | H04N 5/765 |
| 2018/0278896 | A1* | 9/2018 | Schimelpfenig | H04N 5/76 |
| 2022/0321838 | A1* | 10/2022 | Seo | G08G 1/164 |
| 2022/0408053 | A1* | 12/2022 | Jung | G11B 27/102 |
| 2023/0230386 | A1* | 7/2023 | Smith | G06V 20/58 |
| | | | | 348/148 |
| 2023/0379430 | A1* | 11/2023 | Han | H04N 23/667 |
| 2024/0144813 | A1* | 5/2024 | Bohman | B60R 21/013 |
| 2024/0146882 | A1* | 5/2024 | Signell | H04N 7/188 |

* cited by examiner

DRIVE VIDEO RECORDING SYSTEM AND CONTROLLING METHOD OF THE SAME

CROSS-REFERENCE TO RELATED APPLICATION

The present application claims under 35 U.S.C. § 119 (a) the benefit of Korean Patent Application No. 10-2023-0093824, filed on Jul. 19, 2023, the entire contents of which are incorporated herein by reference.

BACKGROUND

(a) Technical Field

The present disclosure relates to a drive video recording system and a controlling method thereof.

(b) Description of the Related Art

A drive video recording system is a system for recording a video of a driving situation of a vehicle, for example.

To this end, the drive video recording system may include a controller, a memory for storing a video, and a camera for recording the video.

In general, the drive video recording system stores vehicle driving data together with a video around a vehicle while driving and records a video according to an input setting when the generation of a set event is sensed while parking.

The drive video recording system was initially called a black box and was only mounted as an external type, but recently, it has already been built into vehicles before the release of the vehicles.

The built-in type is more advantageous than the external type in that it is possible to access driving data of a host vehicle and to connect with other controllers, and its use is expected to gradually increase.

SUMMARY

The user may input a setting for constant video recording or in the event of an impact while parking or driving a vehicle, e.g., by using the user setting menu USM of the user interface. However, in the event of an impact of the vehicle resulting in serious damage, it is necessary to record the video regardless of the user setting, and recording the secondary and additional effects and the post-accident processing process is also important.

The purpose of an embodiment of the present disclosure is to provide a control method of a drive video recording system capable of determining whether a vehicle is seriously damaged in the drive video recording system and forcibly recording a corresponding video regardless of a user setting, and the drive video recording system.

According to an embodiment of the present disclosure, a control method for a drive video recording system, which includes an impact detection sensor, a camera module which monitors surroundings of a vehicle, a first memory which stores video data transmitted from the camera module, a second memory which stores a computer program for controlling the storage of the video data, and a controller which includes a processor executing the computer program, includes determining, by the processor executing the computer program, a serious damage situation according to an impact signal of the impact detection sensor, and determining a recording mode as a serious damage recording mode according to a result of the determination of the serious damage situation.

In at least one embodiment of the present disclosure, the determining of the recording mode as the serious damage recording mode includes performing a first serious damage determination when the impact signal is equal to or greater than a first set value and determining the recording mode as a general recording mode when the impact signal is less than the first set value.

In at least one embodiment of the present disclosure, the performing of the first serious damage determination includes determining whether power of a battery of the vehicle is cut off.

In at least one embodiment of the present disclosure, the determining of the recording mode as the serious damage recording mode further includes determining the recording mode as the serious damage recording mode when it is determined that the power of the battery of the vehicle is cut off.

In at least one embodiment of the present disclosure, the method further includes determining a power supply source when the serious damage recording mode is determined.

In at least one embodiment of the present disclosure, the determining of the power supply source includes determining one of an auxiliary battery and a super capacitor as the power supply source according to whether the auxiliary battery operates normally.

In at least one embodiment of the present disclosure, the determining of one of the auxiliary battery and the super capacitor as the power supply source includes determining whether the auxiliary battery is in a normal operation state, determining the super capacitor as the supply power when it is determined that the auxiliary battery is not in the normal operation state or that the auxiliary battery is in the normal operation state but a power conversion to the auxiliary battery as the power supply source fails, and determining the auxiliary battery as the power supply source when it is determined that the auxiliary battery is in the normal operation state and the power conversion to the auxiliary battery is successful.

In at least one embodiment of the present disclosure, the determining of the recording mode as the serious damage recording mode further includes determining the recording mode as the serious damage recording mode according to a second serious damage determination when it is determined that the power of the battery of the vehicle is not cut off.

In at least one embodiment of the present disclosure, the second serious damage determination includes determining at least one of whether CAN communication is normal, whether LIN communication is normal, whether a power state of the battery of the vehicle is matched to a power state included in communication information, or whether a signal of the camera module is normal.

In at least one embodiment of the present disclosure, the method further includes setting at least one of a driving constant recording mode, an impact driving recording mode, a parking constant recording mode, and a parking impact recording mode according to a user selection, and performing recording, in spite of the setting, when the mode is determined as the serious damage recording mode.

Meanwhile, according to an embodiment of the present disclosure, a drive video recording system includes an impact sensor, a camera module configured to monitor surroundings of a vehicle, a first memory configured to store video data transmitted from the camera module, and a controller including a second memory configured to store a computer program for controlling storage of the video data, and a processor configured to execute the computer program, wherein the processor is further configured to determine a serious damage situation according to an impact signal of the impact sensor and determine a recording mode as a serious damage recording mode according to a result of the determination of the serious damage situation.

In a drive video recording system according to at least one embodiment of the present disclosure, the determining of the recording mode as the serious damage recording mode comprises performing a first serious damage determination when the impact signal is equal to or greater than a first set value and determining the recording mode as a general recording mode when the impact signal is less than the first set value.

In a drive video recording system according to at least one embodiment of the present disclosure, the performing of the first serious damage determination includes determining whether power of a battery of the vehicle is cut off.

In a drive video recording system according to at least one embodiment of the present disclosure, the determining of the recording mode as the serious damage recording mode further comprises determining the recording mode as the serious damage recording mode when it is determined that the power of the battery of the vehicle is cut off.

In a drive video recording system according to at least one embodiment of the present disclosure, the processor is further configured to determine a power supply source when the serious damage recording mode is determined.

In a drive video recording system according to at least one embodiment of the present disclosure, the determining of the power supply source comprises determining one of an auxiliary battery and a super capacitor as the power supply source according to whether the auxiliary battery is normally operated.

In a drive video recording system according to at least one embodiment of the present disclosure, the determining of one of the auxiliary battery and the super capacitor as the power supply source includes determining whether the auxiliary battery is in a normal operation state, determining the super capacitor as the power supply source when it is determined that the auxiliary battery is not in the normal operation state or when it is determined that the auxiliary battery is in the normal operation state but a power conversion to the auxiliary battery as the power supply source fails, and determining the auxiliary battery as the power supply source when it is determined that the auxiliary battery is in the normal operation state and the power conversion to the auxiliary battery succeeds.

In a drive video recording system according to at least one embodiment of the present disclosure, the determining of the recording mode as the serious damage recording mode further includes determining the recording mode as the serious damage recording mode according to a second serious damage determination when it is determined that the power of the vehicle battery is not cut off.

In a drive video recording system according to at least one embodiment of the present disclosure, the second serious damage determination comprises determining at least one of whether CAN communication is normal, whether LIN communication is normal, whether a power state of the battery of the vehicle is matched with a power state included in communication information, and whether a signal of the camera module is normal.

In a drive video recording system according to at least one embodiment of the present disclosure, the processor is further configured to set at least one of a driving constant recording mode, a driving impact recording mode, a parking constant recording mode, and a parking impact recording mode according to a user selection, and perform recording, regardless of the setting, when the recording mode is determined as the serious damage recording mode.

It is possible to secure a video in case of an accident resulting in serious damage by determining whether the vehicle is seriously damaged or not and forcibly recording the video regardless of the user setting.

That is, even when the user fails to input a setting to perform video recording, when the user is impacted enough to cause serious damage, the recording is forcibly performed to secure an evidence video.

A vehicle may include the drive video recording system.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", '-er' "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like.

Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the present disclosure is modified in various ways and has various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

Terms including ordinals such as "first," "second," and the like may be used to describe various elements, but the elements are not limited by the terms. The terms are used only for the purpose of distinguishing one element from another element.

The term "and/or" is used to include any combination of a plurality of items to be included. For example, "A and/or B" includes all three cases such as "A", "B", and "A and B".

When an element is "connected" or "linked" to another element, it should be understood that the element may be directly connected or connected to another element, but another element may exist in between.

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

Meanwhile, the processor includes a semiconductor integrated circuit and/or electronic devices that perform at least one or more of comparison, determination, calculation, and determination in order to achieve a programmed function. For example, the processor may be a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium is electrically connected to the processor, and the processor retrieves and records data from the recording medium. The recording medium and the processor either may be integrated or may be physically separated.

Hereinafter, the embodiments of the present disclosure will be described in detail with reference to the accompanying drawings.

Figure 1:
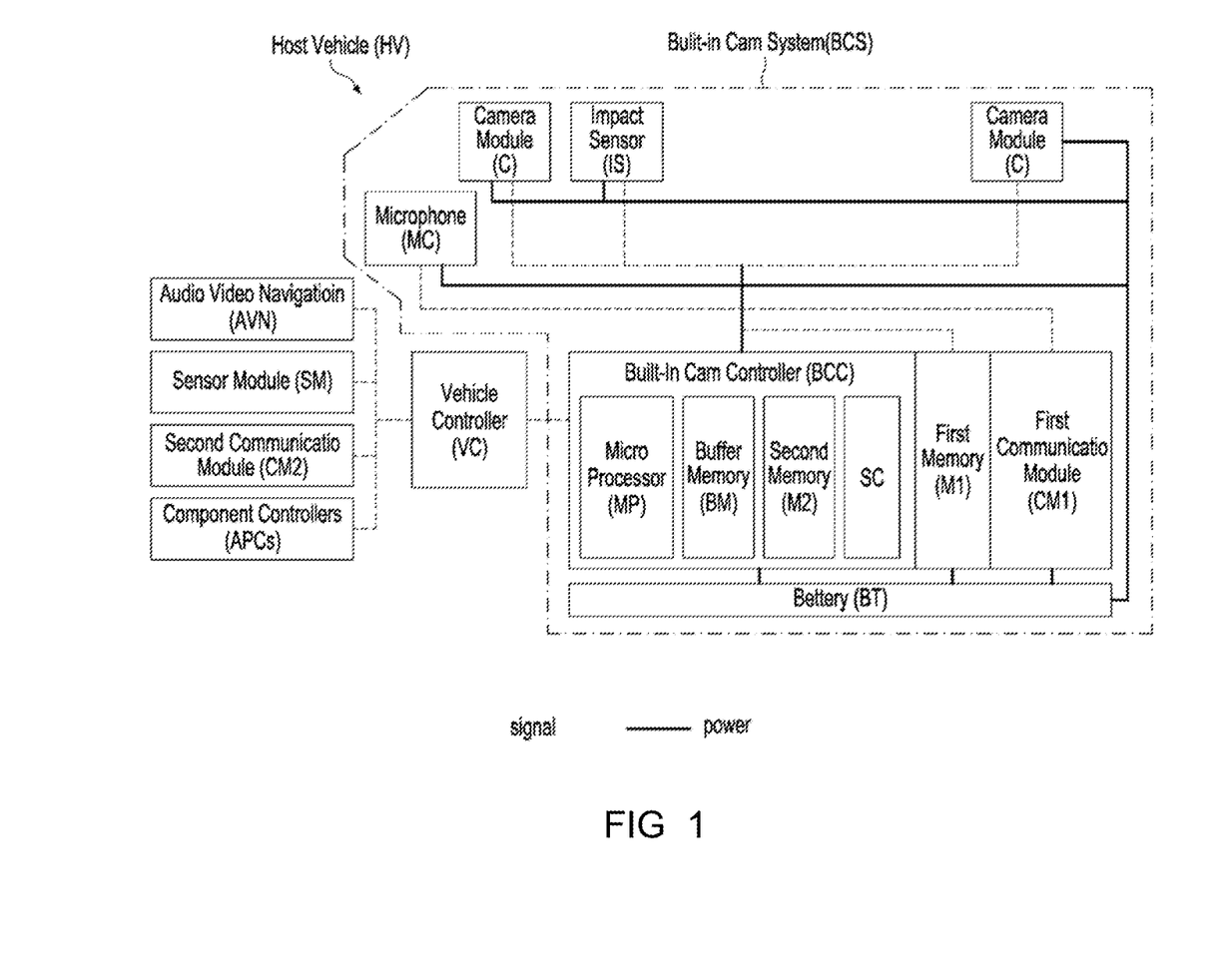
FIG. 1 conceptually illustrates components of a drive video recording system according to an embodiment of the present disclosure.

Referring to FIG. 1, an embedded drive video recording system or so-called built-in cam system BCS, according to an embodiment of the present disclosure, is embedded in a host vehicle HV and includes a camera module C, a computer-readable storage medium M1, a first communication module CM1, a microprocessor MC, an impact sensor IS, a power auxiliary battery BT, and a built-in cam controller BCC.

The drive video recording system of the present embodiment is a built-in type, but it is not limited thereto.

First, the camera module C includes a front camera and a rear camera in this embodiment, but it is not necessarily limited thereto. The front camera is installed to record a front area of the vehicle HV, and the rear camera is installed to record a rear area of the vehicle HV.

For example, the front camera is installed at a position adjacent to the room mirror in the vehicle HV cabin of the window shield, and the rear camera is installed on the rear window of the vehicle HV cabin or the rear bumper.

For example, the front camera and the rear camera support video quality of either an HD, an FHD, or a Quad HD.

It is evident that the front camera and the rear camera do not need to have the same video quality, and a camera of an advanced driving assistance system ADAS of the host vehicle HV may be used.

Further, the camera has an aperture value of F2.0 or less, preferably F1.6 or less. If the aperture value decreases, more light is gathered, so that recording may be made brighter. In addition, by applying video-tuning technique to minimize the noise and the loss of light, clear recording is possible even in a dark environment.

The computer-readable storage medium M1 (hereinafter, referred to as a "memory") includes all kinds of storage devices in which data that can be read by a computer system is stored. For example, the memory may include at least memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In this embodiment, the memory M1 is an external type of 64 Gbyte or an micro SD of more, thereof. For example, a constant recording while driving (hereinafter, referred to as "driving constant recording") may be performed for several hours, and a constant recording while parking (hereinafter, referred to as "parking constant recording") may be performed for several tens of hours. In addition, event recording according to impact detection may be performed up to several tens of times. The event recording may include recording according to impact occurrence while driving (hereinafter, referred to as "driving impact recording") and recording according to impact occurrence while parking (hereinafter, referred to as "parking impact recording"). Here, whether the current mode is the driving mode or the parking mode may be determined as the driving mode when the vehicle start switch is in an ignition on (IGN ON) state and may be determined as the parking mode when the vehicle start switch is not in the ignition on state.

The user may easily check the contents stored in the memory in a desktop computer or the like by extracting the SD card.

The state information of the SD card may be checked through the connected car service, and the replacement timing for the memory state may be checked.

The first communication module CM1 is for wired or wireless communication with the exterior, and it is not limited to the communication protocol.

In the present embodiment, the first communication module CM1 includes a communication device capable of directly communicating with an auxiliary device, and illustratively supports Wi-Fi. The Wi-Fi module of the present embodiment may include an Access Point (AP) function, and a user may easily and quickly access the built-in cam through, for example, a smartphone.

Due to Wi-Fi, users can easily and quickly access the built-in cam through, for example, a smartphone.

The microphone MC supports voice recording. When the driving video of the vehicle HV is recorded, not only the video is recorded but also the voice as well.

The impact sensor IS senses an external impact, and for example, may be a one-axis or three-axis acceleration sensor.

The impact sensor IS may be prepared as the built-in cam system BCS, but it is evident that it may be used as an acceleration sensor installed in the host vehicle HV.

The signals of the impact sensor IS may be a reference for starting points for a later described event recording, and the degree of impact serving as references thereof can be set by the user.

For example, the user can select an impact detection sensitivity which is the reference for event recording when setting up the built-in cam system BCS through a display screen (e.g., a later described AVNT screen) in the vehicle HV.

For example, the impact sensitivity may be classified into five levels: the first level (highly unresponsive), the second level (unresponsive), third step (normal sensitivity), the fourth level (sensitive), and the fifth level (highly sensitive).

The built-in cam system BCS receives power from a battery (e.g., a 12 V battery) installed in the vehicle HV.

Although the system is operated by receiving the power of the vehicle HV battery while parking as well as while driving, there may be an overconsumption problem of the vehicle HV battery, and thus, the present embodiment includes the auxiliary battery BT.

In the present embodiment, the built-in cam system BCS while driving receives power from any one of the vehicle HV battery, of the alternator in the case of an internal combustion engine vehicle, and of the lower DC/DC converter (LDC) in the case of an electric vehicle, but it receives power from a power auxiliary battery BT while parking.

The BT may be charged and discharged according to an operating environment of the vehicle HV, and supplies optimal power for recording while parking and OTA software update.

The charging of the power auxiliary battery BT is performed by a battery of the vehicle HV (a low voltage battery or a high voltage battery of an electric vehicle), or performed by an alternator in the case of the HV.

The built-in cam controller BCC is a superior level controller that controls other components of the built-in cam system BCS, and exchanges signals with the controller VC of the host vehicle HV and/or a second communication module CM2 (vehicle communication module), the sensor module SM, the component controllers APCs, the audio video navigation telematics AVNT, etc. For example, local interconnect network LIN or controller area network CAN communication may be used for such signal exchange.

Here, the sensor module SM includes one or more of a speed sensor, of an acceleration sensor, of a vehicle position sensor (e.g., a GPS receiver), of a steering angle sensor, of a yaw rate sensor, of a pitch sensor, and of a roll sensor, and the component controllers APCs may include one or more of a turn signal controller, of a turn signal controller, of a wiper controller, of an ADAS system controller, and of an airbag controller.

The built-in cam controller BCC controls other components to perform constant recording while driving, constant recording while parking, event recording for recording according to the impact signal of the impact sensor, etc.

When recording, driving information of the vehicle HV is recorded as well.

Here, the vehicle (HV) driving information includes time, vehicle speed, gear position, turn signal information, shock detection degree (one corresponding to the above-described five levels), global positioning system GPS position information, etc.

The vehicle driving information may be received from the vehicle controller VC, but it is that it may also be directly received from a corresponding module or component of the vehicle HV. For example, a vehicle speed may be directly received from a speed sensor of the vehicle HV, a turn signal information (or turn signal information from a turn signal controller) may be directly received from a turn signal controller, or a GPS location information may be received from a AVNT or a GPS receiver.

As described above, the event recording is performed when the event occurrence is detected while parking depending on the impact detection sensitivity set by the user.

In the event recording, recording is performed from a set time before the event occurrence time to a set time after the event occurrence time, and the set time may be selected by the user.

The AVNT is connected to the built-in cam controller BCC through the vehicle controller VC or directly, and the AVNT screen functions as a user interface for receiving various set parameters of the built-in cam system BCS from the user.

The built-in cam controller BCC transmits recorded content to an external server according to a set period, a user selection, or an event (e.g., a degree of impact detection) from a user setting.

The built-in cam controller BCC includes a memory M2 and a processor MP to perform its functions.

In an embodiment, the processor MP may include a semiconductor integrated circuit and/or electronic devices that perform at least one or more of comparison, determination, calculation, and determination to achieve a programmed function. For example, the processor MP may be a computer, a microprocessor MC, a CPU, an ASIC, and electronic circuits (circuitry, logic circuits), or a combination thereof.

The memory M2 may be any type of storage device that stores data that can be read by a computer system, and may include, for example, at least one of a flash memory type, a hard disk type, a micro type, a card type (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2, and the processor MP reads and executes the corresponding software to perform the function of the BCC.

In addition, the built-in cam controller BCC includes a buffer memory BM for determination, calculation, and the like in the processor MP.

Also, the built-in cam controller BCC includes a super capacitor SC. The super capacitor SC is charged when power is applied to the built-in cam controller BCC.

When power is suddenly cut off due to impact, damage, or the like, power charged in the super capacitor SC is used to complete video storage that is in progress.

For example, the super capacitor SC have a charging capacity capable of maintaining the power of the built-in cam controller BCC from several to tens of seconds.

Figure 2A:
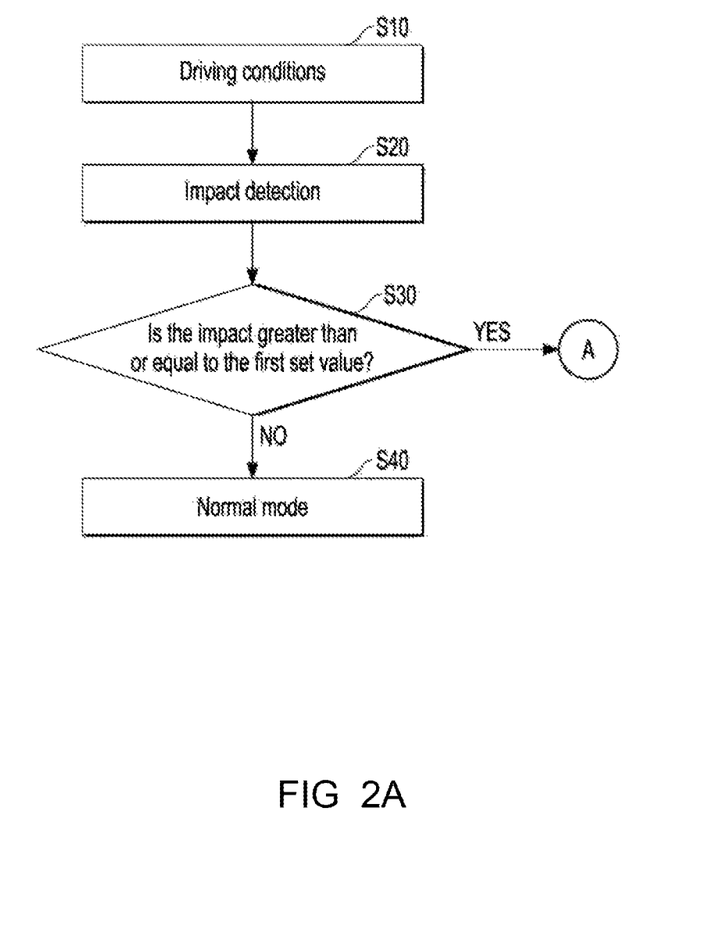
FIGS. 2A to 2C are flowcharts illustrating a method of controlling a drive video recording system according to an embodiment of the present disclosure.

Hereinafter, a control method according to an embodiment of the present disclosure will be described in detail with reference to FIGS. 2A to 2C.

Hereinafter, the control method of FIGS. 2A to 2C will be described as a process in which the processor MP included in the built-in cam controller BCC of the embodiment of FIG. 1 executes the computer program, but the present embodiment is not limited thereto. That is, the control method of the present embodiment is not limited to the drive video recording system of FIG. 1.

First, in S10, a driving condition is checked. That is, it is checked whether the vehicle is turned on. For example, when the vehicle start switch is in an "IGN ON" (ignition on) state, it may be determined that the vehicle start is turned on.

The reason why the current driving situation is limited to the driving situation through S10 is that it is reasonable to minimize a serious damage mode when the current driving situation is not an emergency and dangerous situation. The parking mode is excluded because it is not directly connected to life because it is a condition without a driver. However, S10 is not necessarily required and may be excluded in an embodiment different from the present embodiment.

Next, in S20, the impact is sensed through the impact sensor IS.

Then, the impact sensed in S30 is compared with the first set value.

In the normal mode, the event recording is performed by comparing the impact quantity with the second set value, and the second set value varies according to the sensitivity of the user setting, and the first set value may be a value greater than the highest value of the second set value.

Figure 2B:
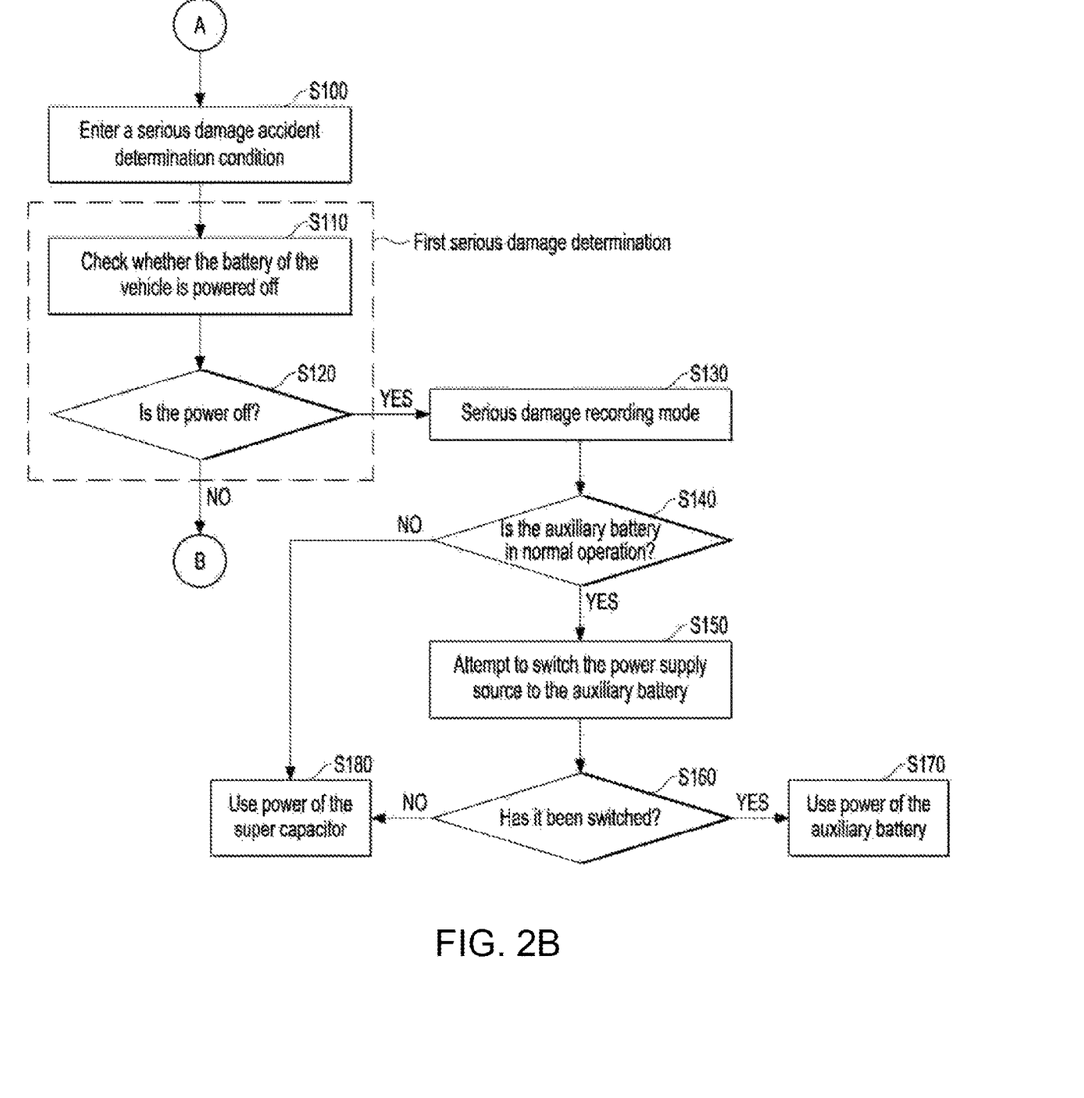

If it is determined that the impact sensed in S30 is less than the first set value, the method proceeds to S40, otherwise, the method proceeds to S100 of FIG. 2B.

If the process proceeds to S40, the recording is performed in the normal mode, not the serious damage mode.

In the normal mode, constant recording and event recording is performed as set by the user through the USM.

When proceeding to S100, the condition for determining an accident resulting in serious damage is entered.

As used herein, an accident characterized as resulting in "serious" damage may refer to a motor vehicle accident that results in injury or death, or results in significant and/or major damage to one or more components or systems of the vehicle, or the vehicle body. An accident with serious damage is distinguished from a minor accident resulting in minimal damage to the vehicle, and which does not affect any vehicle systems.

Then, a first serious damage determination is performed.

For the first serious damage determination, it is checked whether power of the vehicle battery is cut off in S110.

If it is determined that the power of the vehicle battery is cut off (YES in S120), the serious damage recording mode in S130 is performed.

In the serious damage recording mode, recording is forcibly performed in spite of user selection settings for one or more mode(s) among a driving constant recording mode, a driving impact recording mode, a parking constant recording mode, a parking impact recording mode, etc.

For example, in the serious damage recording mode, constant recording and event recording are forcibly performed regardless of user setting.

In this case, in S140, it is determined whether the auxiliary battery BT is normally operated, and when it is determined that the auxiliary battery BT is normally operated, in S150, the power supply source is converted into the auxiliary battery BT.

When the switching is not performed in spite of the attempt to switch the power to the auxiliary battery BT (NO in S160), the super capacitor power is used for the serious damage recording mode (S180).

Naturally, when the switching of the power to the auxiliary battery BT is successful, the power of the auxiliary battery BT is used (S170).

Figure 2C:
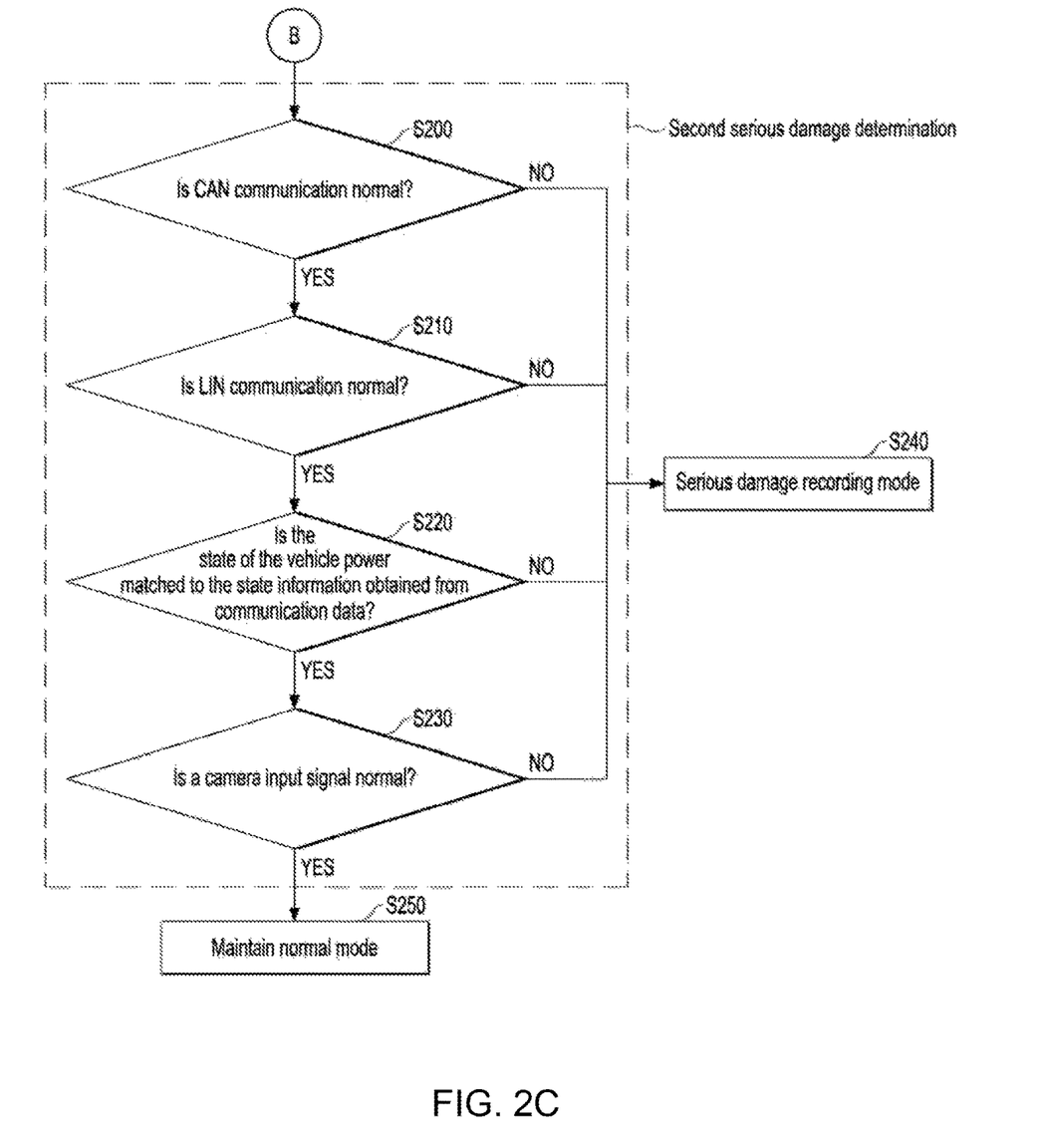

Meanwhile, when it is confirmed in step S120 that the power of the vehicle battery is not cut off, a second serious damage determination of FIG. 2C is performed.

For the second serious damage determination, as shown in FIG. 2C, a determination as to whether the CAN communication of the vehicle is normal, a determination as to whether the LIN communication of the vehicle is normal, a determination as to whether the state of the vehicle battery power is matched (identical) to the state of the power included in communication information, and a determination as to whether the input signal from the camera module C is normal are performed.

When at least one of the above determinations is determined as "NO", the serious damage recording mode of S240 is performed.

Also, if all of the above determinations are determined as "YES", the method proceeds to S250 and maintains the normal mode as is.

Figure 3:
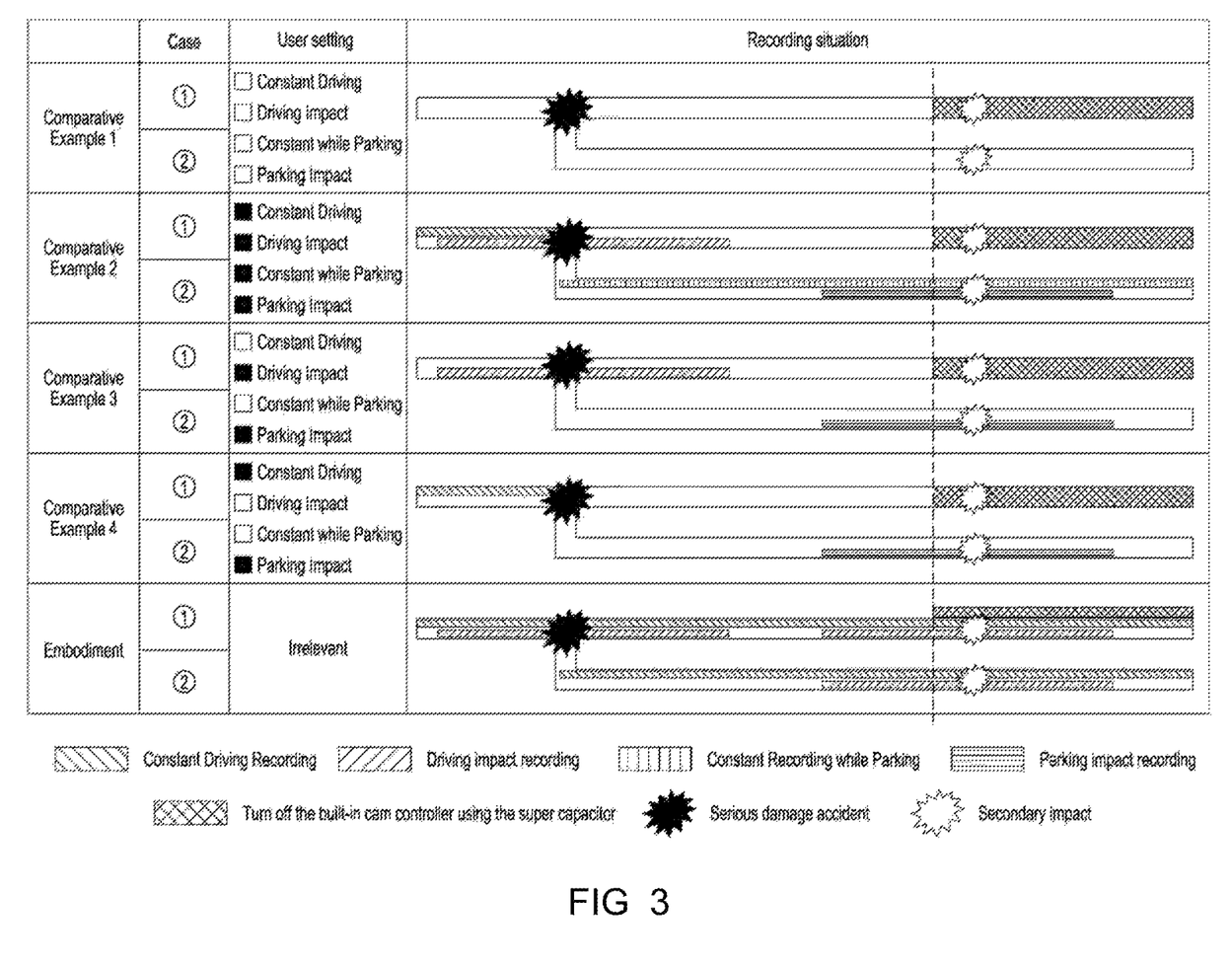
FIG. 3 shows a recording situation for a serious damage situation of a comparative example and an embodiment of the present disclosure.

FIG. 3 shows a comparison between a recording situation in case of an accident resulting in serious damage with respect to a comparative example and the present embodiment in which there is no serious damage recording mode.

In FIG. 3, case (1) means a case where the power of the auxiliary battery BT is not normally operated after the occurrence of the accident with serious damage, case (2) means a case where the power of the auxiliary battery BT is normally operated after the accident with serious damage, and the start switch is identified as "IGN OFF".

First, Comparative Example 1 is a case in which the user does not select any of the driving constant recording, a driving impact recording, a parking constant recording, and a parking impact recording.

In case (1) and case (2) of Comparative Example 1, no recording is performed after the accident with serious damage occurs. However, since it is impossible to use the auxiliary battery BT in the case 1 of Comparative Example 1, the built-in cam controller BCC is switched to Off by using the power of the super capacitor to normally terminate the built-in cam system BCS.

Next, Comparative Example 2 is a case in which the user selects all of the driving constant recording, the driving impact recording, the parking constant recording, and the parking impact recording.

In case (1) of Comparative Example 2, recording of driving is constantly performed until an accident with serious damage takes place, and recording of driving impact is performed before and after the accident with serious damage. At this time, since the auxiliary battery BT is not normally operated after the accident with serious damage, the power of the super capacitor is likewise used, and the built-in cam controller BCC is switched to the Off state.

In case (2) of Comparative Example 2, parking constant recording and parking impact recording proceed after an accident with serious damage. It may be seen that recording for a time before and after the secondary impact is performed as the parking impact recording. In this case, since the auxiliary battery BT is normally operated, the auxiliary battery BT is used as the power supply source.

Comparative Example 3 is a case in which the user selects driving impact recording and parking impact recording.

In case (1) of Comparative Example 3, in the case of an accident with serious damage, driving impact recording proceeds during a time period before and after. Even at this time, since the auxiliary battery BT is not normally operated after the accident with serious damage, the power of the super capacitor is used, and the built-in cam controller BCC is switched to Off.

In case (2) of Comparative Example 3, it may be seen that the parking impact recording proceeds for a time period before and after the secondary impact after the accident with serious damage. An auxiliary battery BT is used as the power supply source.

Comparative Example 4 is a case in which the user selects driving constant recording and parking impact recording.

In the case (1) of Comparative Example 4, driving constant recording is performed before the accident with serious damage, and the built-in cam controller BCC is switched to Off by using the power of the super capacitor after the accident with serious damage.

In case (2) of Comparative Example 4, it may be seen that the parking impact recording proceeds for a time before and after the secondary impact after the accident with serious damage. An auxiliary battery BT is used as the power supply source.

In the embodiment, when an accident with serious damage occurs regardless of user setting, a serious damage recording mode is forcibly performed.

First, in case (1) of the embodiment, driving constant recording that is performed until an accident with serious damage is continuously maintained even after the serious damage. In addition, the recording of the driving impact is performed according to the occurrence of the accident with serious damage, and when the secondary impact occurs, the recording of the driving impact is performed. Since the auxiliary battery BT cannot be used as the power supply source, a super capacitor is used, and the built-in cam controller BCC is also switched to Off.

Meanwhile, in the case (2) of the embodiment, the parking constant recording is forcibly performed after the accident with serious damage, and the parking impact recording is forcibly performed during the secondary impact. As for the supplied power, the auxiliary battery BT is used since the auxiliary battery BT can be used.

What is claimed is:

1. A controlling method of a drive video recording system, the controlling method comprising:
   providing an impact sensor, a camera module configured to monitor the surroundings of a vehicle, a first memory configured to store video data transmitted from the camera module, a second memory configured to store a computer program for controlling storage of the video data, and a controller which includes a processor configured to execute the computer program;
   determining, by the processor executing the computer program, a serious damage situation according to an impact signal of the impact detection sensor;
   determining a recording mode as a serious damage recording mode according to a result of the determination of the serious damage situation; and
   setting at least one of a driving constant recording mode, an impact driving recording mode, a parking constant recording mode, or a parking impact recording mode according to a user selection, and regardless of the setting, performing recording when the recording mode is determined as the serious damage recording mode.

2. The controlling method according to claim 1, wherein the determining of the recording mode as the serious damage recording mode includes performing a first serious damage determination when the impact signal is equal to or greater than a first set value and determining the recording mode as a general recording mode when the impact signal is less than the first set value.

3. The controlling method according to claim 2, wherein the performing of the first serious damage determination includes determining whether power of a battery of the vehicle is cut off.

4. The controlling method according to claim 3, wherein the determining of the recording mode as the serious damage recording mode further includes determining the recording mode as the serious damage recording mode when it is determined that the power of the battery of the vehicle is cut off.

5. The controlling method according to claim 4, further including determining a power supply source when the serious damage recording mode is determined.

6. The controlling method according to claim 5, wherein the determining of the power supply source includes determining one of an auxiliary battery and a super capacitor as the power supply source according to whether the auxiliary battery operates normally.

7. The controlling method according to claim 6, wherein the determining of one of the auxiliary battery and the super capacitor as the power supply source includes:
   determining whether the auxiliary battery is in a normal operation state;
   determining the super capacitor as the supply power when it is determined that the auxiliary battery is not in the normal operation state or that the auxiliary battery is in the normal operation state but a power conversion to the auxiliary battery as the power supply source fails; and
   determining the auxiliary battery as the power supply source when it is determined that the auxiliary battery is in the normal operation state and the power conversion to the auxiliary battery is successful.

8. The controlling method according to claim 3, wherein the determining of the recording mode as the serious damage recording mode further includes determining the recording mode as the serious damage recording mode according to a second serious damage determination when it is determined that the power of the battery of the vehicle is not cut off.

9. The controlling method according to claim 8, wherein the second serious damage determination includes determining at least one of whether CAN communication is normal, whether LIN communication is normal, whether a power state of the battery of the vehicle is matched to a power state included in communication information, or whether a signal of the camera module is normal.

10. A drive video recording system comprising:
    an impact sensor;
    a camera module configured to monitor surroundings of a vehicle;

a first memory configured to store video data transmitted from the camera module; and a controller including a second memory configured to store a computer program for controlling storage of the video data, and a processor configured to execute the computer program, wherein the processor is configured to:

determine a serious damage situation according to an impact signal of the impact sensor, determine a recording mode as a serious damage recording mode according to a result of the determination of the serious damage situation, and set at least one of a driving constant recording mode, an impact driving recording mode, a parking constant recording mode, or a parking impact recording mode according to a user selection, and regardless of the setting, perform recording when the recording mode is determined as the serious damage recording mode.

11. The drive video recording system of claim 10, wherein the determining of the recording mode as the serious damage recording mode comprises performing a first serious damage determination when the impact signal is equal to or greater than a first set value and determining the recording mode as a general recording mode when the impact signal is less than the first set value.

12. The drive video recording system of claim 11, wherein the performing of the first serious damage determination includes determining whether power of a battery of the vehicle is cut off.

13. The drive video recording system of claim 12, wherein the determining of the recording mode as the serious damage recording mode further comprises determining the recording mode as the serious damage recording mode when it is determined that the power of the battery of the vehicle is cut off.

14. The drive video recording system of claim 13, wherein the processor is further configured to determine a power supply source when the serious damage recording mode is determined.

15. The drive video recording system of claim 14, wherein the determining of the power supply source comprises determining one of an auxiliary battery and a super capacitor as the power supply source according to whether the auxiliary battery is normally operated.

16. The drive video recording system of claim 15, wherein the determining of one of the auxiliary battery and the super capacitor as the power supply source includes:

determining whether the auxiliary battery is in a normal operation state;

determining the super capacitor as the power supply source when it is determined that the auxiliary battery is not in the normal operation state or when it is determined that the auxiliary battery is in the normal operation state but a power conversion to the auxiliary battery as the power supply source fails; and determining the auxiliary battery as the power supply source when it is determined that the auxiliary battery is in the normal operation state and the power conversion to the auxiliary battery succeeds.

17. The drive video recording system of claim 12, wherein the determining of the recording mode as the serious damage recording mode further includes determining the recording mode as the serious damage recording mode according to a second serious damage determination when it is determined that the power of the vehicle battery is not cut off.

18. The drive video recording system of claim 17, wherein the second serious damage determination comprises determining at least one of whether CAN communication is normal, whether LIN communication is normal, whether a power state of the battery of the vehicle is matched with a power state included in communication information, and whether a signal of the camera module is normal.

19. A vehicle comprising the drive video recording system of claim 10.

* * * * *